May 3, 1932.  A. KARTVELICHVILI ET AL  1,856,870

COUPLING DEVICE

Original Filed Aug. 23, 1928

INVENTOR
*Alexandre Kartvelichvili.*
*Edmund Chagniard*
BY
*Franklin J. Foster*
ATTORNEY Patented May 3, 1932

1,856,870

UNITED STATES PATENT OFFICE

ALEXANDRE KARTVELICHVILI AND EDMOND CHAGNIARD, OF NEW YORK, N. Y., ASSIGNORS TO CHAGNKART INTERNATIONAL AVIATION CORPORATION, OF NEW YORK, N. Y., A CORPORATION OF NEW YORK

COUPLING DEVICE

Original application filed August 23, 1928, Serial No. 301,458. Divided and this application filed August 28, 1929. Serial No. 388,912.

Our present invention relates to the construction of coupling means for the skeleton frame pieces of the wings, bodies, and other strain-sustaining parts of aeroplanes in general. It is especially adapted, however, for coupling the frame pieces of large hollow aeroplane wings which are adapted to carry useful loads.

As explained in our copending application, Serial No. 301,458, filed August 23rd, 1928, of which the present application is a division, many conventional aeroplane wing constructions utilize a series of longerons, ribs and shaping pieces, the longerons serving to support the strain, the ribs to render the wings indeformable, and the shaping pieces to give the desired exterior configuration to the wings. The ribs and longerons are disposed at right angles to each other. This structural combination fails to produce a body uniformly resistant to the usual stresses and strains on the wings. So many variable factors enter into the wing construction, that it is difficult to calculate accurately the strength of the wing or its resistance to given stresses. It has therefore been the practice to design the wings with a large margin of safety, and a consequent undesirable and needless excess in weight.

Furthermore various prior attempts to design hollow winged planes have produced wings interiorly criss-crossed and encumbered with various strain-supporting struts, ribs and braces. Hence the interiors of such wings have not been clear to receive useful loads even though the wings were strong enough to support them.

Our prior application above referred to discloses means for overcoming these difficulties by the provision of a wing which is substantially hollow yet unencumbered by cross-pieces. The well-known stress-resisting qualities of a triangular unit are utilized and the wing is so designed that triangular units and tetra-hedronal units oppose and resist strains in all directions, the beam and longeron elements which form them being preferably disposed closely adjacent the inner surface of the wing covering and leaving the entire wing interior free to support useful loads.

A special feature of such invention and the one which forms the subject of this divisional application is the special type of substantially universal coupling members which serve to connect the ends of a plurality of adjacent beam members and longeron sections. These couplings are in the nature of spherical universal joints having beam end anchorages substantially universally adjustable about the centers of the couplings, and preferably automatically sustained against any movement relative to the centers of the couplings after the beams and longerons have been attached thereto due to the triangular and tetra-hedronal relationship of the beam and longeron units above referred to.

The couplings permit rigid and effective connection of a plurality of frame ends, regardless of the relative angularities of the frame pieces to be coupled and moreover, accomplish this result while maintaining the axes of the frame members radial to the center of the coupling piece so that the latter is subjected to no off center or eccentric loading stresses.

Other and more general objects of the invention are to provide a coupling of simple, practical construction, which will be rugged, durable and efficient in use, and well suited to the requirements of economical manufacture.

With the above noted and other objects in view, the invention consists in certain novel features of construction and combinations and arrangements of parts as will be more fully hereinafter set forth and pointed out in the claims. The invention may be more fully understood from the following description in connection with the accompanying drawings, wherein:

Figure 1:
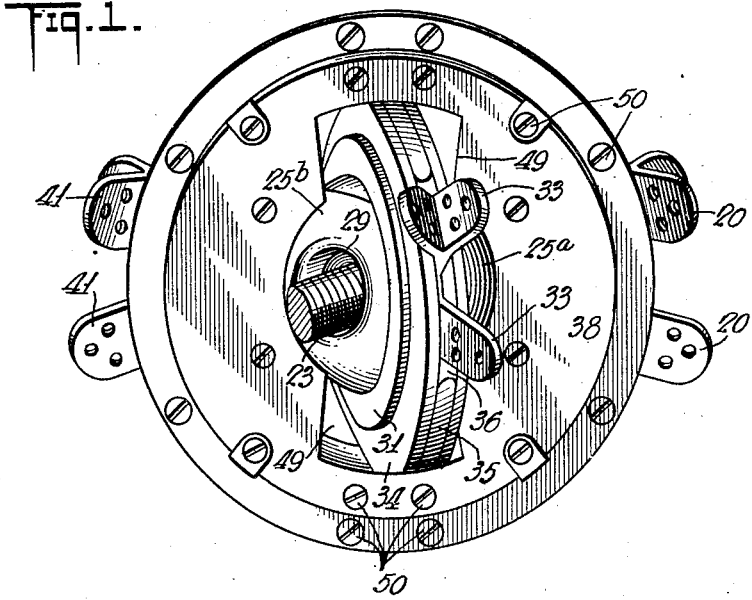
Figure 1 is a perspective view of one of the universal coupling members.
Figure 2:
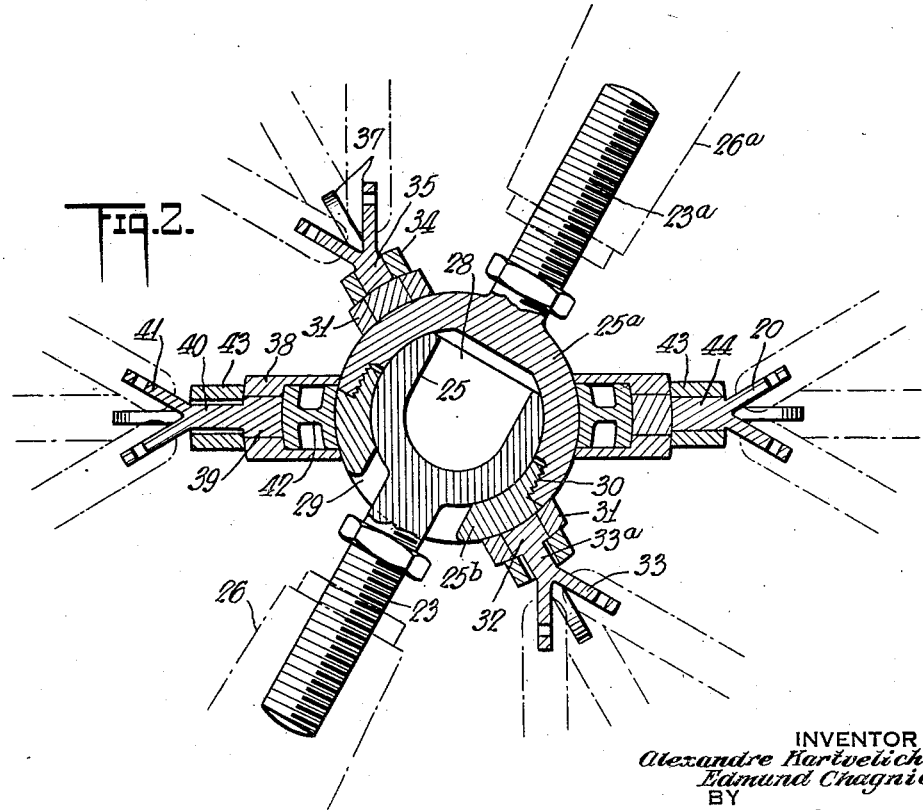
Figure 2 is a transverse sectional view through such coupling member.

We have devised a unique type of coupling member with which any number of beams, longerons or other frame pieces of a hollow wing structure or the like, for instance, the frame members of the wing shown in our copending application, may be conveniently connected together and held in the desired angular relationship. For the sake of clarity, we have avoided showing the details of the various longerons, beams, and other frame elements in the drawings and in Figure 2 have indicated in dotted lines the ends of a few frame pieces which are adapted to be coupled in the angular relationship shown, by the use of our improved coupling device. The coupling member includes a ball 25 hollowed out as at 28 to lighten its weight and rigidly fixed on the end of screw bolt 23 adapted to be secured to the end of one of the beams 26 of the wing frame. A cooperating generally hemispherical socket member 25a rotatable on section 25, is carried by a corresponding bolt 23a adapted to be secured in another beam 26a. Ball 25 fits within the socket 25a and is retained therein by an approximately semi-spherical complementary socket section 25b having an opening 29 therein to receive the bolt 23 and screwing into the mouth of the socket 25a as at 30.

Socket member 25a thus provides a substantially spherical construction about which ring members carrying supplemental beam attaching means are rotatably adjustable. All of the ring members include three sections, two outer retaining rings and a rotatable, central coupling element supporting ring. In the innermost of the rings we have designated the outer guide or retainer ring sections at 31, the coupling member carrying section at 32, and the coupling members at 33. These coupling members are in the nature of apertured ears integral with the arcuate carrier member 32 and adapted to be secured to the ends of the special beam ribs shown in the parent case.

Rotatably mounted on the ring 31 and 32 is an outer ring including annular outer sections 34 and an arcuate coupling carrier section 35, the latter being slotted or cut away as at 36 in order to accommodate the integral connection 33a between the member 32 and its ears 33. Corresponding ears 37 are carried by the member 35 and adapted to be attached to a beam end as indicated in dotted lines.

A third ring unit is mounted for adjustment directly on the surface of the spherical socket 25a; this ring unit including side rings 38 and a central arcuate member 39 disposed between them and carrying a reduced extension 40 from which project the attaching ears 41.

The weight of the device is lightened by the use of a relatively light-weight filler piece 42 of H-shape in cross section lying between the rings 38 and serving as an abutment for the member 39. Members 38 and 42 are cut away as at 49 to clear the first two ring units and permit adjustment thereof.

The fourth and last ring unit rides on the surface of the ring unit 38, 39 and includes annular ring members 43 between which is adjustably mounted an arcuate member 44 carrying the attaching ears 20. The member 44 is of course, cut away to accommodate the reduced extension 40 of the member 39.

Each ring unit includes three sections, the two outer annular guiding sections and the inner arcuate coupling carrying section. With these sections in proper position of adjustment, they are preferably secured together as by screws 50 or other appropriate securing devices. If desired, blocks may be used to fill the slot 36, and the slot between rings 43, 44.

All of the coupling elements, (by which we mean to include the bolts 23, 23a and the ears 20, 33, 37 and 41) are substantially universally adjustable about the center of the socket 25a. Obviously, this structure is peculiarly well suited for coupling the converging ends of a plurality of angularly disposed beam members, longeron members and other frame members and that in every instance, the frame unit will be disposed radially of the coupling element, i. e. the axis of the frame member will intersect the center of the ball element.

It is to be understood that the coupling member while especially designed to meet the requirements of aeroplane construction, may prove useful in other positions and in other arts.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the drawings shall be interpreted as illustrative and not in a limiting sense.

We claim:

1. A coupling device of the class described including a ball and a substantially spherical socket member receiving said ball each carrying a coupling device, a ring rotatably adjustable on the socket, and a coupling member carried thereby, said ring including a pair of spaced annular sections and a central arcuate section confined between them.

2. A coupling device of the class described including a ball and a substantially spherical socket member receiving said ball each carrying a coupling device, a ring rotatably adjustable on the socket, and a coupling member carried thereby, said ring including a pair of spaced annular sections and a central arcuate section confined between them, all three sections bearing on the socket and the central one carrying the coupling member.

3. A coupling device of the class described including a ball and a substantially spherical socket member receiving said ball each carrying a coupling device, a ring rotatably adjustable on the socket, and a coupling member carried thereby, a second ring rotatably adjustable on the first one and carrying a coupling member, said second ring including a cutaway portion through which the coupling member of the first ring projects.

4. A coupling device of the class described including a ball and a substantially spherical socket member receiving said ball each carrying a coupling device, a ring rotatably adjustable on the socket, a coupling member carried thereby and a second larger coupling member carrying ring rotatable on the spherical socket and cut away to provide clearance for the adjustment of the first ring.

5. A coupling device of the class described, including substantially spherical, relatively rotatable ball and socket members, the socket member comprising a pair of sections substantially embracing the ball, an anchoring device fixed to the ball and projecting through an opening in the socket, an anchoring device carried by the socket, a plurality of annular relatively adjustable anchorage carrying elements concentric with the socket, one of said elements being mounted on the socket and the other of said elements being mounted on the first.

Signed at New York city, in the county of New York, and State of New York, this 27th day of August, 1929.

ALEXANDRE KARTVELICHVILI.
EDMOND CHAGNIARD.